March 15, 1960     C. L. ASHBROOK     2,928,646

CHLORINE FLOW CONTROL VALVE

Filed June 10, 1958

United States Patent Office 2,928,646
Patented Mar. 15, 1960

2,928,646
CHLORINE FLOW CONTROL VALVE
Clifford L. Ashbrook, Houston, Tex.

Application June 10, 1958, Serial No. 741,068

5 Claims. (Cl. 251—63)

This invention relates generally to fluid flow control devices and more particularly to a chlorine flow control valve.

Chlorine has a wide variety of uses. A primary use for this element is sanitation and recently there has been a tremendous increase in the demand for control devices suitable for use in conjunction with swimming pools. Frequently, a swimming pool is owned by an individual and is situated on his property and maintained by him. This demand requires control devices which are inexpensive but extremely reliable in operation. Chlorine, whether in gas form or in aqueous solution, is a dangerous substance. For example, a few breaths of a gas mixture consisting of 1,000 parts of chlorine gas per million parts of air is likely to be fatal. In addition, the gas is corrosive and materials which are utilized in control devices must be carefully selected. Further it has been found difficult to provide an adequate sealing mechanism to insure the control of the gas.

It is an object of the invention to provide an improved valve structure suitable for control of the flow of chlorine gas.

Another object of the invention is to provide an improved valve structure having a unique sealing means suitable to control the flow of chlorine.

Another object of the invention is to provide an improved valve structure which may be economically manufactured.

The body of valve according to the preferred embodiment of the invention is preferably manufactured from a long chain polyethylene material which is highly resistant to the corrosive effect of chlorine. The valve includes a pressure actuated piston member having a conical nose portion adapted to cooperate with a deformable resilient annular sealing member formed from neoprene. The nose portion of the piston has a circumference which is larger than the corresponding aperture in the sealing member. The nose portion, on entering the aperture, distorts the sealing member and forces it against the retaining portions to provide adequate sealing around the outside of the member. In addition, the nose portion is driven into the aperture such that a large annular sealing area between the nose portion and the sealing member is provided. This structure is susceptible to inexpensive manufacture and provides a compact chlorine control device suitable for use in home swimming pools.

Other objects, features and advantages of the invention will be seen as the following description of the preferred embodiment progresses in conjunction with the drawing, in which.

Figure 1:
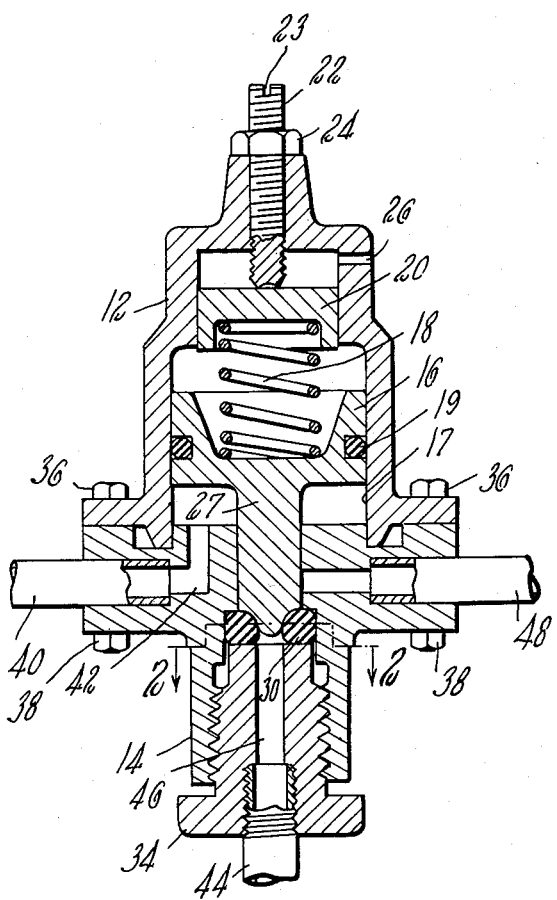
Fig. 1 is a sectional view of the valve structure according to the preferred embodiment.

With reference to Fig. 1, the valve casing 10 comprises two housing members, an upper member 12 and a lower member 14. A piston 16, positioned within a cylinder 17 in the upper housing portion, is adapted to move axially therein. An O ring 19, or a similar sealing medium, is secured in a recess in the wall of the piston and bears against the cylinder wall to provide suitable sealing.

The piston 16 is biased downwardly by a spring 18 which is positioned between the piston 16 and an adjustable disc 20. The adjustable disc 20 rides within a cylindrical cavity above the cylinder in the upper portion of the housing member 12. A threaded shaft 22 which passes through the top of the housing member 12 bears against the top of the disc 20. The position of the disc may be adjusted by turning the shaft 22. A screw driver slot 23 in the upper end of the shaft is provided for this purpose and a lock nut 24 may be tightened against the top of the upper casing 12 to securely position the shaft 22 relative to the casing. The aperture 26 in the casing above the disc is provided to permit the escape of air trapped above the adjustable disc 20 and thus to increase the ease of adjustment. The biasing force provided by the spring 18 against the piston 16 thus may be adjusted.

The piston 16 has an elongated cylindrical shaft portion 27, which depends below the main piston and which extends into a cylinder 28 of substantially equal diameter to the shaft. This cylinder is formed in the central portion of the lower casing member 14. The piston shaft 27 has a conical nose portion 29, the end of which is rounded such that a smooth exterior surface is provided.

The valve structure is positioned in the lower casing and includes an annular sealing member 30 formed from a resilient deformable material which is resistant to chlorine, such as neoprene.

Figure 2:
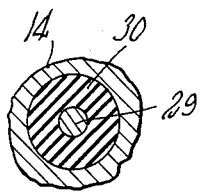
Fig. 2 is a sectional view of the sealing area along the lines 2—2 of Fig. 1.
Figure 3:
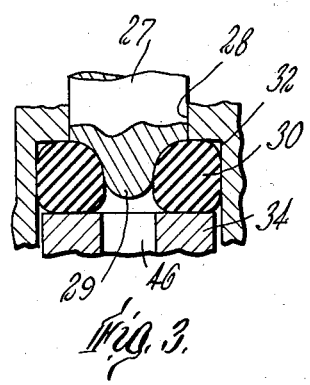
Fig. 3 is an enlarged view of the valve sealing portion showing the valve structure in closed and sealing position.
Figure 4:
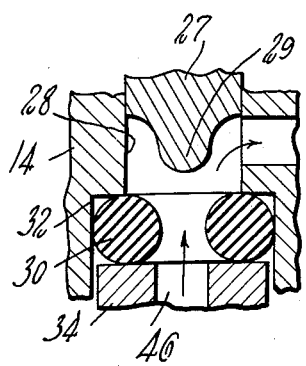
Fig. 4 is an enlarged view of the valve sealing portion showing the valve structure in open position.

The sealing member is preferably a solid doughnut-shaped ring which has a circular cross section in the dimension shown in section in Figs. 1, 3 and 4. The diameter of this section is preferably greater than the diameter of the internal aperture (viewed as in Fig. 2) such that an annular surface of substantial area is provided. This sealing member is secured against a seating surface 32 and positioned at the base of the cylinder 28 in which the piston shaft 27 moves. A threaded plug 34 which cooperates with a threaded aperture formed in the casing below the seating surface 32 is screwed into position against and clamps the member 30 against the seating surface 32 such that it is secured positioned therein. The sealing member may be slightly deformed by the pressure of the plug such that a sealing surface is provided between the seating surface 32 and the outer walls of the chamber as seen in Fig. 4.

The lower casing 14 is attached to the upper casing 12 by means of a plurality of bolts 36 and cooperating nuts 38. The valve body may be provided with a suitable mounting structure. Three conduits are connected to the valve body.

A water inlet conduit 40 is secured to the lower casing and it discharges into a passageway 42 which communicates with the cylinder 17. A volume is defined by this cylinder, the upper surface of casing member 14 and the lower surface of the piston 16. The position of the piston thus may be controlled by the pressure of water within this volume which is exerted on the lower surface of the piston, increased pressure tending to drive the piston upward.

A chlorine inlet conduit 44 is secured to the threaded plug 34 which is positioned in the lower portion of the lower casing 14. The threaded plug has a longitudinal passageway 46 therethrough which provides communication between the conduit 44 and the valve structure.

A chlorine outlet conduit 48 is secured to the lower casing in communication with a horizontal passageway which terminates at the wall of the cylinder 28. This passageway terminus is blocked by the piston shaft 27 when the shaft is at its lowermost position as viewed in Fig. 1.

The valve operates as follows. The piston 16 is moved in response to changes in water pressure. When the water pressure is below a certain predetermined value, the piston 16 moves downward under the biasing influence of the spring 18 and the conical nose portion 29 of the shaft 27 enters into the central portion of the sealing member 30. The nose portion is preferably formed with a rounded end which enters the central aperture in the annular sealing member. The nose portion is dimensioned to substantially conform with the comparatively large sectional radius of the sealing member under sealing conditions. Thus, the surface of the nose portion is tapered outwardly to a dimension greater than the internal diameter of the annulus and has a concavely curved annular surface adjacent its base. As the shaft moves downward into the aperture, the nose portion expands the sealing member, forcing it against the seating surface into improved sealing relationship. In addition, the central aperture is distorted by the wiping or shearing action of the nose such that the nose contacts the annulus over a substantial area rather than at a line contact and thus an excellent sealing relationship is provided. The relationship between the nose portion and the sealing member in sealing position is shown in Fig. 3. Too, preferably, the inner diameter of the toroidal sealing member 30 should be less than half of the diameter of the cylinder 28 and its outer diameter should be more than three times its inner diameter.

In general, then, the structure of the invention includes a casing made up of members 12 and 14 which together provide an upper enlarged cylindrical bore 17, an intermediate cylindrical bore 28 and a lower cylindrical bore into which plug 34 is screwed to clamp sealing member 30 against seating surface 32. The piston member positioned within such casing includes an enlarged piston 16 fitting the upper cylindrical bore and a concentric piston shaft 27 fitting the intermediate bore 28. The piston member is adjustably urged downwardly by spring 18 together with its cooperating disk 20 and screw-threaded shaft 22 at a pressure equal to the predetermined safe minimum water pressure, so normally it is held upwardly by greater water pressure exerted on the annular surface of piston 16 surrounding its shaft 27. When the pressure drops below the predetermined minimum, however, the chlorine flow is cut off between the chlorine passage through the wall of the intermediate cylindrical bore 28 connected to conduit 48 and the chlorine passage extending from the lower bore at the bottom of sealing member 30 through passageway 46 in plug 34, the substantial cooperating seal provided between the member 30 and piston shaft nose 29 being extremely effective in this regard to provide a completely safe valve for dangerous gases such as chlorine.

Thus it is seen that the invention provides a simple and inexpensive yet safe valve structure which may be manufactured from molded plastic materials and which is easily assembled. The valve structure provides an excellent seal against the passage of chlorine as is required in handling that material in both gaseous and in aqueous forms. Although the preferred embodiment of the invention has been described herein, it is not intended that the invention be limited thereto or to details thereof, and departures may be made therefrom within the spirit and scope of the following claims.

I claim:

1. A chlorine flow safety valve operable by water pressure to shut off chlorine flow below a predetermined water pressure comprising a casing having an upper enlarged cylindrical bore, an intermediate cylindrical bore of lesser diameter concentric therewith and connected to said upper cylindrical bore by an annular surface portion having a water inlet, and a lower cylindrical bore of greater diameter than said intermediate cylindrical bore concentric therewith and connected to said intermediate cylindrical bore by an annular seating surface portion, said casing having chlorine inlet and outlet passages with one of said chlorine passages extending through the wall of said intermediate cylindrical bore and the other of said chlorine passages extending from said lower cylindrical bore, a generally toroidal deformable resilient sealing member positioned against said annular seating surface portion, said member having an outer diameter generally the same as the diameter of said lower cylindrical bore and an inner diameter substantially less than the diameter of said intermediate cylindrical bore, means for maintaining said sealing member in firm pressure contact with said annular seating surface portion, a piston member positioned in said casing, said piston member having an enlarged piston portion fitting said upper cylindrical bore and a concentric shaft portion fitting said intermediate cylindrical bore, with an annular piston surface portion therebetween and a generally conical nose portion on the other end of said shaft portion having a concavely curved annular surface adjacent its base for cooperative engagement with the inner surface of said sealing member, and adjustable means for urging said piston member downwardly in opposition to water pressure applied to its annular surface portion through said water inlet, said piston member moving downwardly upon reduction of said water pressure below a predetermined value to press its nose portion against said sealing member to prevent chlorine flow between said chlorine inlet and outlet passages.

2. A safety valve as claimed in claim 1 wherein the inner diameter of said sealing member is less than half of the diameter of said intermediate cylindrical bore and the outer diameter of said sealing member and said lower cylindrical bore is more than three times the inner diameter of said sealing member.

3. A safety valve as claimed in claim 1 wherein said means for maintaining said sealing member in firm pressure contact with said annular seating surface portion comprises a plug member screw-threaded into said lower cylindrical bore, said plug member having a longitudinal passageway therethrough communicating with said lower cylindrical bore to provide one of said chlorine passages.

4. A safety valve as claimed in claim 1 wherein said adjustable means for urging said piston member downwardly includes resilient means positioned between the upper end of said piston member and said casing and screw-threaded adjusting means therefor extending longitudinally of said casing.

5. A safety valve as claimed in claim 4 wherein said resilient means is a coil spring, and said screw-threaded adjusting means extends concentrically through said casing into contact with said spring.

References Cited in the file of this patent

UNITED STATES PATENTS

| 1,884,179 | Parks | Oct. 25, 1932 |
| 2,328,805 | Holthouse | Sept. 7, 1943 |
| 2,594,626 | Earle | Apr. 29, 1952 |
| 2,645,449 | Gulick | July 14, 1953 |

FOREIGN PATENTS

| 1,307 | Great Britain | May 26, 1864 |
| 6,152 | Switzerland | Mar. 4, 1893 |
| 282,823 | Switzerland | Oct. 1, 1952 |